United States Patent
Olakangil et al.

(10) Patent No.: US 7,940,766 B2
(45) Date of Patent: May 10, 2011

(54) MULTICASTING UNICAST PACKET/MULTIPLE CLASSIFICATION OF A PACKET

(75) Inventors: Joseph Olakangil, Midvale, UT (US);
Gregory G. Page, Sandy, UT (US);
Robert Leon Sangorinz, Cottonwood Height, UT (US)

(73) Assignee: Alcatel Lucent, Paris (FR)

( * ) Notice: Subject to any disclaimer, the term of this patent is extended or adjusted under 35 U.S.C. 154(b) by 461 days.

(21) Appl. No.: 11/776,661

(22) Filed: Jul. 12, 2007

(65) Prior Publication Data
US 2008/0137660 A1    Jun. 12, 2008

Related U.S. Application Data

(60) Provisional application No. 60/869,164, filed on Dec. 8, 2006.

(51) Int. Cl.
*H04L 12/28* (2006.01)
(52) U.S. Cl. ............................................. 370/390
(58) Field of Classification Search ............... 370/392, 370/249, 428, 404, 401; 709/221, 226
See application file for complete search history.

(56) References Cited

U.S. PATENT DOCUMENTS

| | | | |
|---|---|---|---|
| 6,760,776 B1 * | 7/2004 | Gallo et al. | 709/238 |
| 7,298,705 B2 * | 11/2007 | Shankar et al. | 370/249 |
| 7,408,883 B2 * | 8/2008 | Deragon et al. | 370/249 |
| 7,792,100 B2 * | 9/2010 | Hato et al. | 370/389 |
| 7,826,481 B2 * | 11/2010 | Kalkunte et al. | 370/467 |
| 2002/0009083 A1 * | 1/2002 | Ambe et al. | 370/390 |
| 2002/0018489 A1 * | 2/2002 | Ambe et al. | 370/475 |
| 2004/0264380 A1 * | 12/2004 | Kalkunte et al. | 370/238 |
| 2005/0254490 A1 * | 11/2005 | Gallatin et al. | 370/389 |
| 2008/0095160 A1 * | 4/2008 | Yadav et al. | 370/390 |

* cited by examiner

*Primary Examiner* — Michael J Moore, Jr.
(74) *Attorney, Agent, or Firm* — The Capitol Patent & Trademark Law Firm, PLLC

(57) ABSTRACT

A switch and a method are described herein that are capable of performing the following steps: (a) receiving the unicast packet which is a L3 routed packet at a port in a first Virtual Local Area Network (VLAN); (b) routing the received packet to a loopback port in a second VLAN; (c) receiving the routed packet which is now a L2 multicast packet from the loopback port in the second VLAN; and (d) bridging the routed packet to multiple ports in the second VLAN.

22 Claims, 2 Drawing Sheets

MULTICASTING UNICAST PACKET/MULTIPLE CLASSIFICATION OF A PACKET

CLAIMING BENEFIT OF PRIOR FILED U.S. APPLICATION

This application claims the benefit of U.S. Provisional Application Ser. No. 60/869,164 filed on Dec. 8, 2006 and entitled "Multicasting Unicast Traffic/Multiple Classification of a Packet". The contents of this document are hereby incorporated by reference herein.

TECHNICAL FIELD

The present invention relates to a switch that receives a unicast packet (which has a routed Media Access Control (MAC) address) in a first Virtual Local Area Network (VLAN) and then multicasts/floods/bridges copies of the packet (after it has been modified to have a multicast MAC address) from a second VLAN.

BACKGROUND

The following abbreviations are herewith defined, at least some of which are referred to in the following description associated with the prior art and the present invention.

| | |
|---|---|
| ARP | Address Resolution Protocol |
| CLI | Command Line Interface |
| CPU | Central Processing Unit |
| ECMP | Equal Cost Multi-Path |
| IP | Internet Protocol |
| LPM | Lowest Prefix Match |
| MAC | Media Access Control |
| NI | Network Interface Card |
| SA | Source Address |
| TTL | Time to Live |
| VLAN | Virtual Local Area Network |

It would be desirable to have a switch that can receive a unicast packet (which has a router MAC address) in a first VLAN and then multicast/flood copies of that packet from a second VLAN. The ability to multicast a unicast packet (e.g., traffic, data stream) in this manner would be desirable in a wide variety of applications including, for example, server farms and redundant firewalls. In the first case, it would be desirable if a user can have their switch multicast the received unicast packet to multiple servers because each of the servers need to receive a redundant backup of the unicast packet. In the second case, it would be desirable if a user can have their switch multicast the received unicast packet to redundant firewalls because each of the firewalls need to receive the same packets so that they can provide the necessary redundancy.

The traditional switches cannot receive unicast packets at one VLAN and then multicast the packets at a second VLAN because: (1) the packet is routed; (2) the packet does not have a broadcast MAC address as the destination MAC address; (3) the packet does not have a multicast MAC address as the destination MAC address; and (4) the packet does not have a multicast IP address as the destination IP address. Accordingly, there has been and is a need to address this particular shortcoming and other shortcomings which are associated with the traditional switches. This need and other needs are satisfied by the present invention.

SUMMARY

In one aspect, the present invention provides a switch and method for multicasting a unicast packet by: (a) receiving the unicast packet which is a L3 routed packet at a port in a first VLAN; (b) routing the received packet to a loopback port in a second VLAN; (c) receiving the routed packet which is now a L2 multicast packet from the loopback port in the second VLAN; and (d) bridging the routed packet to multiple ports in the second VLAN.

In another aspect, the present invention provides a switch and method for multicasting a unicast packet by receiving the unicast packet which is a L3 routed packet at a port in a first VLAN. Then, the switch and method route the received unicast packet to a loopback port in a second VLAN, where the routing operation further includes: (1) looking-up a destination MAC address of the received unicast packet within a L2 table and determining that the destination MAC address is a router MAC address; (2) looking-up a destination IP address of the received unicast packet within a L3 table and after a match is found modifying the received unicast packet as follows: (i) replacing the router MAC address with a multicast MAC address; (ii) modifying a VLAN tag from the first VLAN to the second VLAN; and (iii) decrementing a TTL value. Thereafter, the switch and method receive the routed packet which is now a L2 multicast packet from the loopback port in the second VLAN. Finally, the switch and method bridge the routed packet to multiple ports in the second VLAN, where the bridging operation further includes: (1) looking-up a destination MAC address of the received routed packet within the L2 table and determining that the destination MAC address is not present within the L2 table because the destination MAC address is a multicast MAC address; and (2) flooding copies of the routed packet to the multiple ports in the second VLAN.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
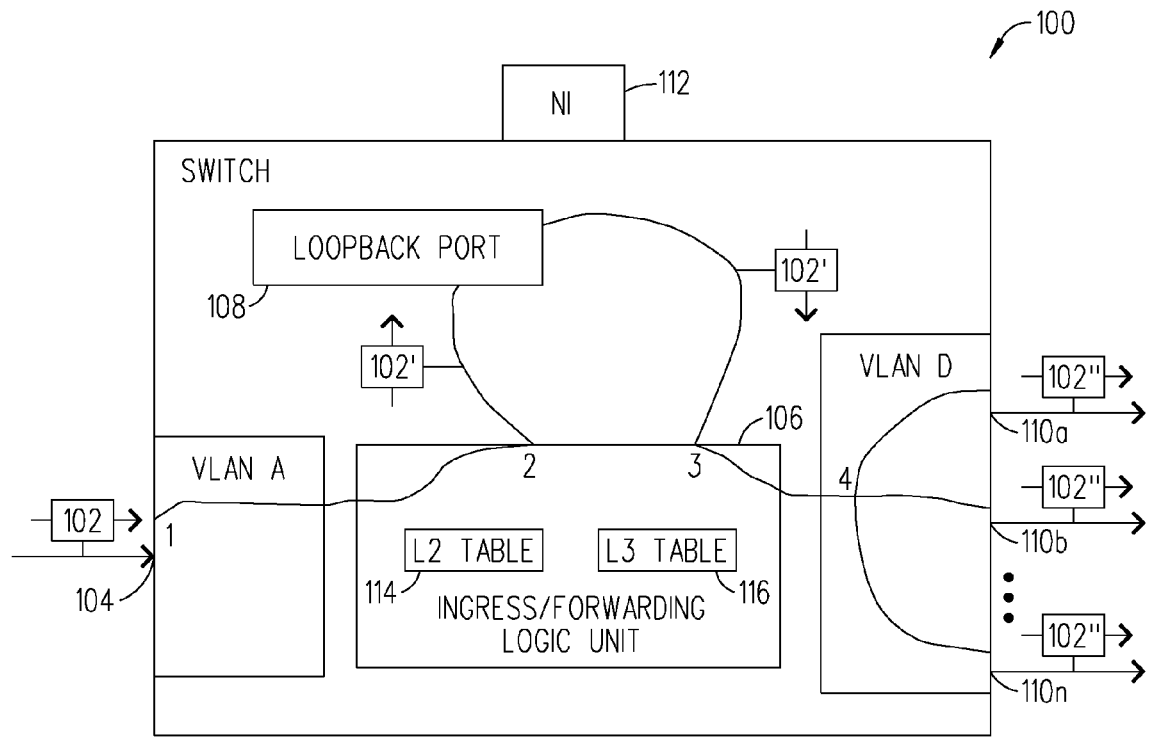
FIG. 1 is a block diagram illustrating the basic components of a switch that has been configured to multicast a received unicast packet in accordance with the present invention.
Figure 2:
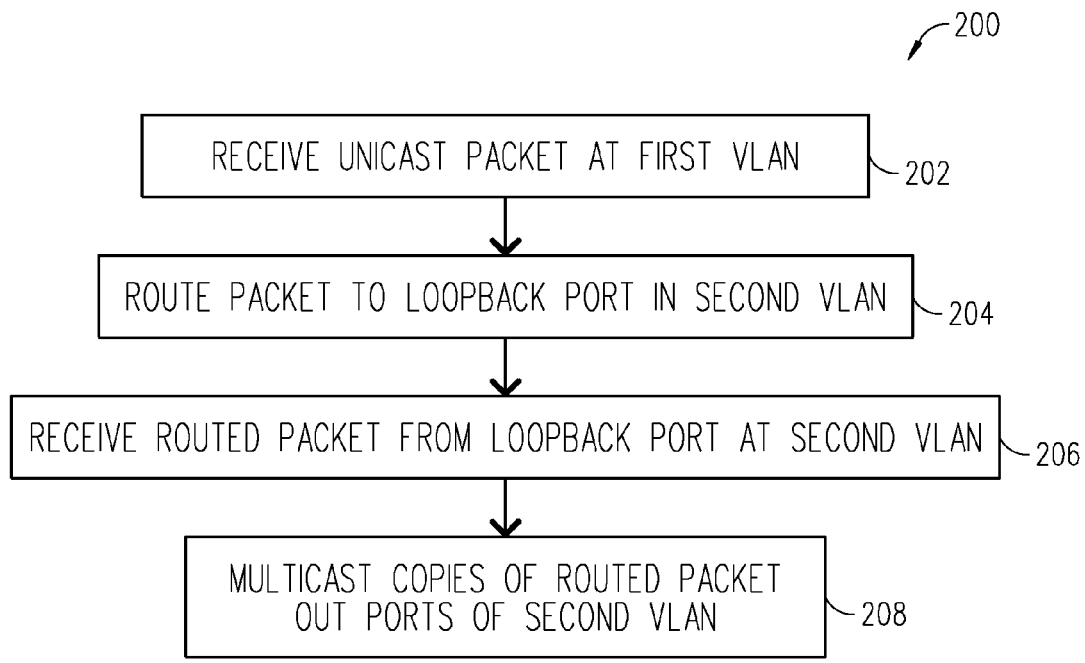
FIG. 2 is a flowchart illustrating the basic steps of a method for multicasting a unicast packet in accordance with the present invention.

Referring to FIGS. 1 and 2, there are respectively shown a block diagram of a switch 100 and a flowchart of a method 200 that can be implemented by the switch 100 to multicast a unicast packet in accordance with the present invention (note: a packet is also considered to be traffic by those skilled in the art and as such the two terms may be used interchangeably herein). In operation, the switch 100 receives a unicast packet 102 (which has a router MAC address and is a L3 routed packet 102) at a front panel port 104 in a first VLAN A (see point 1 and step 202). The switch 100 has an ingress/forwarding logic unit 106 that routes the received packet 102' (which has been modified to have a multicast MAC address) to a loopback port 108 (e.g., programmed to be in a PHY loopback mode) in a second VLAN D (see point 2 and step 204) (note: the loopback port 108 can occur in, for example, chip logic, PHY, MAC or even be externally cabled). Then, the switch 100 and in particular the ingress/forwarding logic unit 106 receives the routed packet 102' (which is now a L2 multicast packet) from the loopback port 108 in the second VLAN D (see point 3 and step 206). Thereafter, the switch 100 and in particular the ingress/forwarding logic unit 106 multicasts/bridges/floods copies of the routed packet 102" to multiple ports 110a, 110b . . . 110n in the second VLAN D (see point 4 and step 208). An exemplary scenario is described next to help further explain how the switch 100 by implementing method 200 can receive the unicast packet 102 (which has a router MAC address) in a first VLAN A and then multicast the received packet 102" (after it has been routed and modified to have a multicast MAC address) from a second VLAN D in accordance with the present invention.

In the exemplary scenario, assume the switch 100 has a free port (e.g., port 108) which is then configured to be in a PHY loopback mode (via internal programming of software). In addition, the loopback port 108 is configured to be an 8021Q port and is tagged in all of the VLANs within the switch 100 (via internal programming of software) (note: an 8021Q port sends tagged packets which also indicate the originating VLAN A and the traversing VLAN D). Moreover, the switch 100 has a NI 112 which an operator can use a CLI to configure a L2 table 114 and a L3 table 116 located therein which makes it possible to implement the present invention (note: how these particular tables are used will be discussed in detail below). Assume the L2 table 114 (e.g., the L2_Entry_Table 114) is configured as follows:

L2 TABLE

| L2 Entry[1] |
| --- |
| 00:d0:95:81:bb:00 L3 = 1 |

And, assume the L3 table 116 (e.g., the L3_Entry_IPV4 Unicast_Table 116, the L3 DEFIP_Table 116, the EGR_L3_NEXT_HOP_Table 116, the ING_L3_NEXT_HOP_Table 116 and the EGR_L3_INTF_Table 116) has entries which are configured as follows:

L3 TABLE[2]

L3_ENTRY_IPV4 UNICAST
IP Addr. = IP D 128.251.40.22
Next Hop Index = 1
EGR_L3_NEXT_HOP[3]
MAC ADDRESS = 01:00:00:00:00:02
INTF_NUM = 1
ING_L3_NEXT_HOP[4]
MODULEID, PORT_TGID = Port L (26)
EGR_L3_INTF L3 TABLE[2]-continued MAC ADDRESS FOR SA replacement = Router MAC 00:d0:95:81:bb:00
VID = VLAN D Note 1: 00:d0:95:81:bb:00 is the Destination MAC address (router MAC address) of incoming packet 102.
Note 2: To populate the L3 table 116, the operator configures the ARP for IP address D using the CLI as follows: arp 128.251.40.22 01:00:00:00:00:02 (where IP D = 128.251.40.22 and multicast MAC = 01:00:00:00:00:02).
Note 3: 01:00:00:00:00:02 is the multicast MAC address for the modified routed packet 102'.
Note 4: The next hop port is identified as Port L (26) which is the loopback port 108.

Figure 3A:
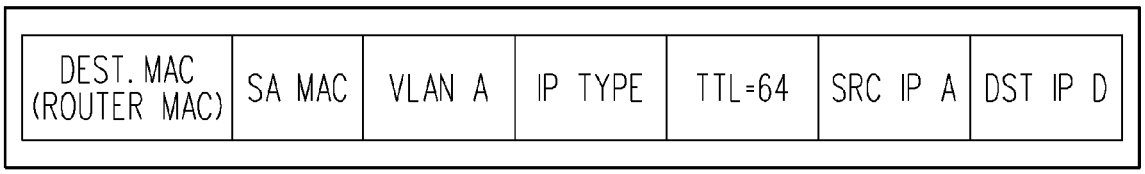
FIGS. 3A-3D are diagrams which illustrate the different fields of a packet when it is received, routed and multicast by the switch in accordance with the present invention.

At point 1, the packet 102 (which is destined to IP address D) originally ingresses the switch 100 at port 104 in VLAN A (see FIG. 1). FIG. 3A illustrates the relevant fields that are associated with an exemplary incoming packet 102 which include: (1) Destination MAC address (which is a Router MAC address); (2) SA MAC address; (3) VLAN tag (which is VLAN A); (4) IP Type; TTL (which is set at 64); (5) Src IP address (which is Src IP A); and (6) Dst IP address (which is Dst IP D).

Figure 3B:
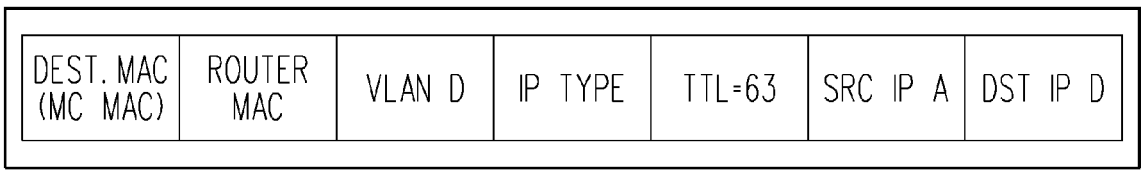

At point 2, the ingress/forwarding logic unit 106 takes the Destination MAC address (in this example 00:d0:95:81:bb:00) from packet 102 and looks-up the L2_Entry_Table 114. The L2_Entry Table 114 has this Destination MAC address with the L3 bit set which indicates that this Destination MAC address is a router MAC address. As a result, the ingress/forwarding logic unit 106 forwards the packet 102 through the L3 Routing Process where the Dst IP address D (in this example 128.251.40.22) is looked-up in the L3_Entry_IPV4_Unicast_Table 116 or L3_DEFIP_Table 116. A match is found for Dst IP address D in the L3 routing table, at which point, the ingress/forwarding logic unit 106 modifies the packet 102 and egresses the modified packet 102' out the next hop port 108 (loopback port 108). The packet 102 is modified as follows: (1) replace the router MAC address (00:d0:95:81:bb:00) with a multicast MAC address (01:00:00:00:00:02) (see the EGR_L3_NEXT_HOP field in the L3 table 116); (2) change the VLAN tag from the VLAN A to VLAN D (see the EGR_L3_INTF field in the L3 table 116) (note: the router MAC address is needed in this field because whenever a packet is routed the source MAC address of the packet is changed to the MAC address of the current switch which routed the packet); and (3) decrement the TTL from 64 to 63. FIG. 3B illustrates the relevant fields that are associated with an exemplary modified incoming packet 102' which include: (1) Destination MAC address (which is a multicast MAC address); (2) SA MAC address; (3) VLAN tag (which is VLAN D); (4) IP Type; TTL (which is set at 63); (5) Src IP address (which is Src IP A); and (6) Dst IP address (which is Dst IP D).

In point 2, it should be appreciated that when a packet like incoming packet 102 is destined to the router MAC address, the packet 102 is determined to be routed. This implies that the destination of the packet 102 is not explicitly obtained from the packet 102 but from the routing L3 table 116 (e.g., L3_Entry_IPV4_Unicast_Table 116, next hop table 116, LPM table 116). The routing L3 table 116 is looked up by using the destination IP address within the packet 102. If a match is found in the routing L3 table 116, then the packet 102 is routed to the destination port 108 as indicated by the ING_L3_NEXT_HOP field in the L3 table 116. When the packet 102 is routed, the packet 102 is modified so that its destination MAC address becomes the next hop MAC address (or the multicast MAC address). The VLAN tag of the packet 102 is also changed from the ingress VLAN A to the egress VLAN D. Plus, the TTL on the packet 102 is also decremented by one as required by ARP to prevent loops. The packet 102 is considered a L3 packet when it first ingresses the switch 100 and when it is routed it is still considered a L3 packet.

Figure 3C:
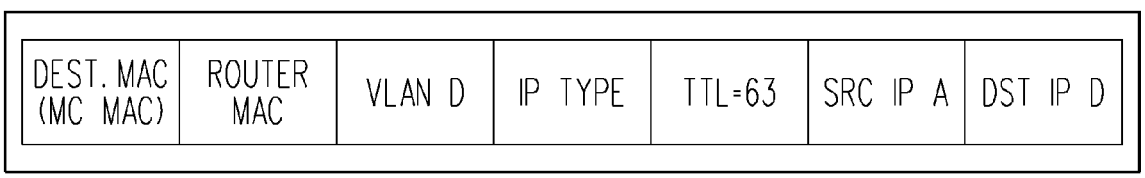

At point 3, the routed packet 102' has egressed out the loopback port 108 or if one looked at this from a different view point the routed packet 102' has ingressed the switch 100 via the loopback port 108 (note: recall that loopback port 108 is also associated with VLAN D). The routed packet 102' is now considered a L2 packet within the log of the switch 100. FIG. 3C illustrates the relevant fields that are associated with an exemplary loopbacked packet 102' which include: (1) Destination MAC address (which is a multicast MAC address); (2) SA MAC address (3) VLAN tag (which is VLAN D); (4) IP Type; TTL (which is set at 63); (5) Src IP address (which is Src IP A); and (6) Dst IP address (which is Dst IP D). As can be seen, the loopbacked packet 102' is the same as the modified packet 102' but the fact is that the packet 102' has egressed the loopback port 108 at point 2 and again ingressed the loopback port 108 at point 3. Thus, even though the contents of the modified packet 102' and the loopbacked packet 102' are the same, technically the loopbacked packet 102' is a new packet and as such goes through the forwarding logic again as will be discussed in detail in the following paragraph.

Figure 3D:
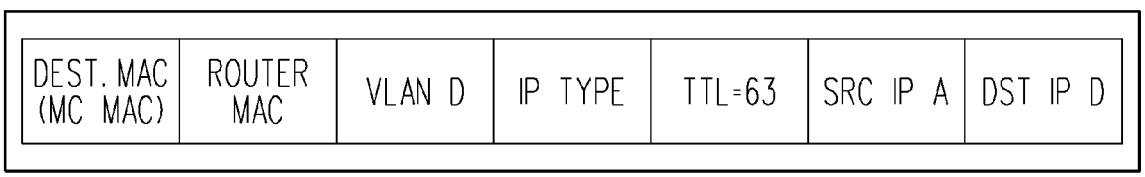

At point 4, the ingress/forwarding logic unit 106 takes the Destination MAC address (in this example 01:00:00:00:00:02) from the loopbacked packet 102' and looks-up the L2_Entry_Table 114. In this case, the Destination MAC address is a multicast MAC address which would not be present in the L2_Entry_Table 114. As the destination MAC address is not present in the L2_Entry_Table 114 and the ingress/forwarding logic unit 106 is unable to determine the final destination, then the ingress/forwarding logic unit 106 floods copies of the loopbacked packet 102' in Vlan D. Thus, ports 110a, 110b ... 110n being members of VLAN D receive a copy of the loopbacked packet 102' (which is now technically a bridged packet 102"). FIG. 3D illustrates the relevant fields that are associated with an exemplary bridged packet 102" which include: (1) Destination MAC address (which is a multicast MAC address); (2) SA MAC address; (3) VLAN tag (which is VLAN D); (4) IP Type; TTL (which is set at 63); (5) Src IP address (which is Src IP A); and (6) Dst IP address (which is Dst IP D). At this point, the packet 102 has been routed once and bridged once within the switch 100 but the user perceives the packet 102 has having only been routed once by the switch 100.

It should be appreciated that the destination MAC address does not need to be a multicast MAC address instead any MAC address which does not exist in the MAC table could be used. The multicast MAC address was used in this exemplary implementation so that the software can easily determine when to provide the desired multicasting behavior. Plus, if the MAC address is a L2 multicast MAC address then the L2 Multicast table 114 can be programmed to multicast the packet 102 out selective ports of the second VLAN D. In particular, if the MAC address is a L2 multicast MAC, then the L2MC_PTR can be programmed to point to an entry in the L2MC table. And, the PORT_BITMAP field in the L2MC table indicates the ports the packet is to be multicast out on and is referenced when the destination MAC is a MULTI-CAST MAC (note: flooding and multicasting are the same when the packet is sent to all of the ports in a VLAN but the term multicasting and not flooding is used to indicate the forwarding of the packet to selected ports in a VLAN).

The present invention has several different applications in which it could be used and two of those applications are as follows (for example).

1. Server Farms: Server farms can have multiple servers which require redundant backup of the data stream (packets). In this case, the servers could reside on separate ports (output ports of VLAN D) of the switch 100 but they each would receive the same data (packets) simultaneously, at wire rate, with very little configuration and very little resource overhead.

2. Redundant Firewalls: Redundant firewalls need to see the same traffic (packets), so that they can provide redundancy. With the present invention, the switch 100 can route the data (packets) out to both firewalls simultaneously with no CPU overhead, as the routing is done in hardware.

In addition, the present invention has several different alternatives where a switch can receive a unicast packet (which has a router MAC address) in a first VLAN and then multicast/flood copies of the packet (after it had been routed and modified to have a multicast MAC address) from a second VLAN. These alternative embodiments are as follows (for example):

1. The present invention could be expanded to cover multi-chip systems, where the switch 100 can use a loopback port that is located on another chip (note: the switch 100 described above was assumed to have one chip that was associated with the aforementioned VLANS, ports, loopback port, ingress/forwarding logic unit, and routing tables). In this alternative embodiment, the routing tables in one chip can be configured to route the packet to a loopback port on a remote chip, if the local chip does not have a free loopback port. The packet would traverse from the local chip to the remote chip, using the same mechanism it does for normal routing, viz. fabric/HiGig ports of the switch 100.

2. The current implementation of the switch 100 uses a single loopback port 108 to route packets 102 that are received at all of the front panel ports 104 which are associated with VLAN A. This implementation where only one loopback port is used can reduce the bandwidth available to individual data streams (packets 102) because there are multiple front panel ports 104 associated with VLAN A which can receive the data streams. To increase the bandwidth, the switch 100 can have multiple loopback ports which are configured as a single linkagg. This results in the switch 100 essentially having a loobacked Linkagg. In this case, the routing tables would now be configured to route the traffic (packets) to the linkagg, as opposed to a single loopback port. In another alternative embodiment, the switch 100 could be configured to have multiple ports to be in a loopback mode, and configured to have the routing tables point to an ECMP table which would cause the packets 102 to use an ECMP route (based on a hashing scheme) where different loopback ports would be selected based on different hashings.

3. The present invention can also be extended since it is now possible for a FFP (Fast Filter Processor) to classify/process a packet twice because it ingresses the switch 100 two different times (see point 1 and 3). In particular, the FFP can now classify the packet twice and thus apply multiple rules to the same packet (pre-routing and post routing rules). For instance, the FFP/TCAM on Firebolt chips currently process packets on the ingress, pre-routing. In some cases it would also be desirable to process the packet after it is routed, after the packet has been modified by the routing process, so as to possibly identify traffic going to different next hops. The present invention enables an operator to use the FFP to process a packet a second time if desired after it has been routed. As a result, the operator could now apply policies which, for example, prioritize or rate-limit the traffic (packet) if it is destined to a certain next hop. Without the loopback method 200 of the present invention this is not possible to do today.

Although several embodiments of the present invention has been illustrated in the accompanying Drawings and described in the foregoing Detailed Description, it should be understood that the present invention is not limited to the disclosed embodiments, but is capable of numerous rearrangements, modifications and substitutions without departing from the spirit of the invention as set forth and defined by the following claims.

The invention claimed is:

1. A method for multicasting a unicast packet, said method comprising the steps of:
   receiving the unicast packet which is a L3 routed packet at a port in a first Virtual Local Area Network (VLAN);
   routing the received unicast packet to a loopback port in a second VLAN;
   receiving the routed packet which is now a L2 multicast packet from the loopback port in the second VLAN; and
   bridging the L2 multicast packet from the loopback port to multiple ports in the second VLAN.

2. The method of claim 1, wherein said routing step further includes:
   looking-up a destination Media Access Control (MAC) address of the received unicast packet within a L2 table and determining that the destination MAC address is a router MAC address;
   looking-up a destination Internet Protocol (IP) address of the received unicast packet within a L3 table and after a match is found modifying the received unicast packet as follows:
   replacing the router MAC address with a multicast MAC address;
   modifying a VLAN tag from the first VLAN to the second VLAN; and
   decrementing a Time to Live (TTL) value.

3. The method of claim 1, wherein said bridging step further includes:
   looking-up a destination Media Access Control (MAC) address of the received routed packet within a L2 table and determining that the destination MAC address is not present within the L2 table because the destination MAC address is a multicast MAC address; and
   flooding copies of the routed packet to the multiple ports in the second VLAN.

4. The method of claim 1, wherein said bridging step further includes multicasting copies of the routed packet to selected multiple ports within the second VLAN if the destination Media Access Control (MAC) address within the received routed packet is a L2 multicast MAC address.

5. The method of claim 1, wherein said loopback port is a tagged loopback port.

6. The method of claim 1, wherein said loopback port is a member of a loopback port linkagg.

7. The method of claim 1, wherein said loopback port is selected from multiple loopback ports by an equal cost multi-path (ECMP) table.

8. The method of claim 1, further comprising a step of processing the routed packet prior to performing the step of bridging the routed packet to multiple ports in the second VLAN.

9. A switch, comprising:
   a port that receives an unicast packet which is a L3 routed packet, wherein said port is in a first Virtual Local Area Network (VLAN);
   an ingress/forwarding logic unit that routes the received unicast packet to a loopback port in a second VLAN;
   said ingress/forwarding logic unit also receives the routed packet which is now a L2 multicast packet from the loopback port in the second VLAN; and
   said ingress/forwarding logic unit also bridges the L2 multicast packet from the loopback port to multiple ports in the second VLAN.

10. The switch of claim 9, wherein said ingress/forwarding logic unit routes the received unicast packet to the loopback port in the second VLAN by:
    looking-up a destination Media Access Control (MAC) address of the received unicast packet within a L2 table and determining that the destination MAC address is a router MAC address;
    looking-up a destination Internet Protocol (IP) address of the received unicast packet within a L3 table and after a match is found modifying the received unicast packet as follows:
    replacing the router MAC address with a multicast MAC address;
    modifying a VLAN tag from the first VLAN to the second VLAN; and
    decrementing a Time to Live (TTL) value.

11. The switch of claim 9, wherein said ingress/forwarding logic unit bridges the routed packet to multiple ports in the second VLAN by:
    looking-up a destination Media Access Control (MAC) address of the received routed packet within a L2 table and determining that the destination MAC address is not present within the L2 table because the destination MAC address is a multicast MAC address; and
    flooding copies of the routed packet to the multiple ports in the second VLAN.

12. The switch of claim 9, wherein said ingress/forwarding logic unit is able to bridge copies of the routed packet to selected multiple ports within the second VLAN if the destination Media Access Control (MAC) address within the received routed packet is a L2 multicast MAC address.

13. The switch of claim 9, wherein said loopback port is a tagged loopback port.

14. The switch of claim 9, wherein said loopback port is a member of a loopback port linkagg.

15. The switch of claim 9, wherein said ingress/forwarding logic unit interfaces with an equal cost multi-path (ECMP) table to select the loopback port from multiple loopback ports.

16. The switch of claim 9, wherein said ingress/forwarding logic unit is located on a local chip and selects the loopback port which is located on a remote chip if the local chip does not have an available loopback port.

17. The switch of claim 9, further comprising a fast filter processor that processes the routed packet prior to said ingress/forwarding logic unit bridging the routed packet to the multiple ports in the second VLAN.

18. A method for multicasting a unicast packet, said method comprising the steps of:
    (a) receiving the unicast packet which is a L3 routed packet at a port in a first Virtual Local Area Network (VLAN);
    (b) routing the received unicast packet to a loopback port in a second VLAN, where said routing step further includes:
    (1) looking-up a destination Media Access Control (MAC) address of the received unicast packet within a L2 table and determining that the destination MAC address is a router MAC address;
    (2) looking-up a destination Internet Protocol (IP) address of the received unicast packet within a L3 table and after a match is found modifying the received unicast packet as follows:
  (i) replacing the router MAC address with a multicast MAC address;
  (ii) modifying a VLAN tag from the first VLAN to the second VLAN; and
  (iii) decrementing a Time to Live (TTL) value; and
(c) receiving the routed packet which is now a L2 multicast packet from the loopback port in the second VLAN;
(d) bridging the L2 multicast packet from the loopback port to multiple ports in the second VLAN, where said bridging step further includes:
  (1) looking-up a destination MAC address of the received routed packet within the L2 table and determining that the destination MAC address is not present within the L2 table because the destination MAC address is a multicast MAC address; and
  (2) flooding copies of the routed packet to the multiple ports in the second VLAN.

19. The method of claim 18, wherein said loopback port is a tagged loopback port.

20. The method of claim 18, wherein said loopback port is a member of a loopback port linkagg.

21. The method of claim 18, wherein said loopback port is selected from multiple loopback ports by an equal cost multi-path (ECMP) table.

22. The method of claim 18, further comprising a step of processing the routed packet prior to performing the step of bridging the routed packet to multiple ports in the second VLAN.

* * * * *